United States Patent
Devitt et al.

(10) Patent No.: US 7,150,487 B2
(45) Date of Patent: Dec. 19, 2006

(54) TRAILER TAILGATE

(75) Inventors: Jon W. Devitt, Ida Grove, IA (US); Gerald Wiertsema, Ida Grove, IA (US)

(73) Assignee: Midwest Industries, Inc., Ida Grove, IA (US)

( * ) Notice: Subject to any disclaimer, the term of this patent is extended or adjusted under 35 U.S.C. 154(b) by 0 days.

(21) Appl. No.: 11/344,481

(22) Filed: Jan. 31, 2006

(65) Prior Publication Data

US 2006/0125271 A1    Jun. 15, 2006

Related U.S. Application Data

(62) Division of application No. 10/869,265, filed on Jun. 16, 2004.

(51) Int. Cl.
*B62D 33/00* (2006.01)

(52) U.S. Cl. .......................... 296/61; 414/537

(58) Field of Classification Search .................. 296/61, 296/62; 414/537, 482
See application file for complete search history.

(56) References Cited

U.S. PATENT DOCUMENTS

| 4,020,957 A | 5/1977 | Wren |
| 5,678,984 A | 10/1997 | Petersen |
| 6,186,734 B1 | 2/2001 | Maurer |

FOREIGN PATENT DOCUMENTS

DE    3632067    5/1988

*Primary Examiner*—Joseph D. Pape
(74) *Attorney, Agent, or Firm*—Sturm & Fix LLP

(57) ABSTRACT

A wedge-shaped trailer tailgate providing a loading ramp and a planar surface in combination with the trailer deck when the tailgate is in its transport position. A planar deck is better for cargo hauling, but also provides little wind resistance for improved hauling efficiency. The wedge shape with elastic bumpers attached provides for support on loading heavy objects such as motorcycles. Taillights are recessed into the thick end of the wedge-shaped trailer tailgate so they face backward when the tailgate is in its transport position and are shielded under the trailer deck when the tailgate is in its loading-ramp position.

14 Claims, 3 Drawing Sheets

TRAILER TAILGATE

CROSS-REFERENCE TO RELATED APPLICATIONS

This application is a Divisional of U.S. patent application Ser. No. 10/869,265 filed Jun. 16, 2004, entitled TRAILER TAILGATE, and is incorporated herein by reference in its entirety.

BACKGROUND OF THE INVENTION

1. Field of the Invention

This invention relates generally to a trailer. More particularly, this invention relates to a novel tailgate for a trailer. The tailgate is especially suited, but not limited, to a motorcycle transport trailer.

2. Background Art

Utility trailers, as well as those for a specific use such as the transport of motorcycles, all-terrain vehicles, snowmobiles, etc. are often equipped with a tailgate. Usually, the tailgate serves only to help keep the cargo in the trailer when the tailgate is closed. Some trailers are equipped with tailgates that may be used for a loading ramp. These tailgates tend to be either very short, making the loading ramp too steep, or very long, so they stand very high when closed. A tall closed tailgate results in significant wind resistance, reducing the efficiency of the prime mover pulling the trailer.

There is, therefore, a need for a trailer tailgate providing an adequately shallow approach angle for loading, yet does not present significant wind resistance when in transit.

BRIEF SUMMARY OF THE INVENTION

One object of the present invention is to provide a loading ramp having a shallow slope for ease and safety of loading, especially for loading street bike motorcycles that have a low ground clearance. Another object is for the tailgate to be aerodynamically efficient in transit at road speeds. Still another object is for the tailgate to fold up in a transport position such that a deck of the trailer and the folded tailgate, together, make up a substantially planar surface.

The tailgate of the present invention pivots on an axis of rotation that is disposed above the top surface of the tailgate when in a loading-ramp position. This helps to maintain a lower upper surface of the tailgate (again, when in its loading-ramp position), making the slope of the ramp more amenable to loading. The ramp is wedge shaped, with the thinnest edge of the wedge at the rear when it is in its loading-ramp position. Rubber bumpers are located near the axis of rotation of the tailgate, the bumpers being positioned facing downward when the tailgate is in its loading-ramp position. The rubber bumpers provide protection to the tailgate and trailer when loading heavy objects by bearing on the pavement or ground surface.

Due to the wedge shape of the tailgate, at the hinge end, the thickness of the tailgate permits the tailgate to fold into a transport position such that the trailer's deck and folded tailgate together provide a substantially planar surface; in addition, when in the loading-ramp position, the rubber bumpers are sufficiently low to provide the support mentioned above when loading heavy cargo such as a motorcycle. In the transport position, the tailgate of the present invention also lies flat against the bed of the trailer, thus providing little wind resistance. A latch pin secures the tailgate in the transport position.

Other objects, advantages and novel features of the present invention will become apparent from the following detailed description of the invention when considered in conjunction with the accompanying drawings.

DETAILED DESCRIPTION OF THE INVENTION

Figure 1:
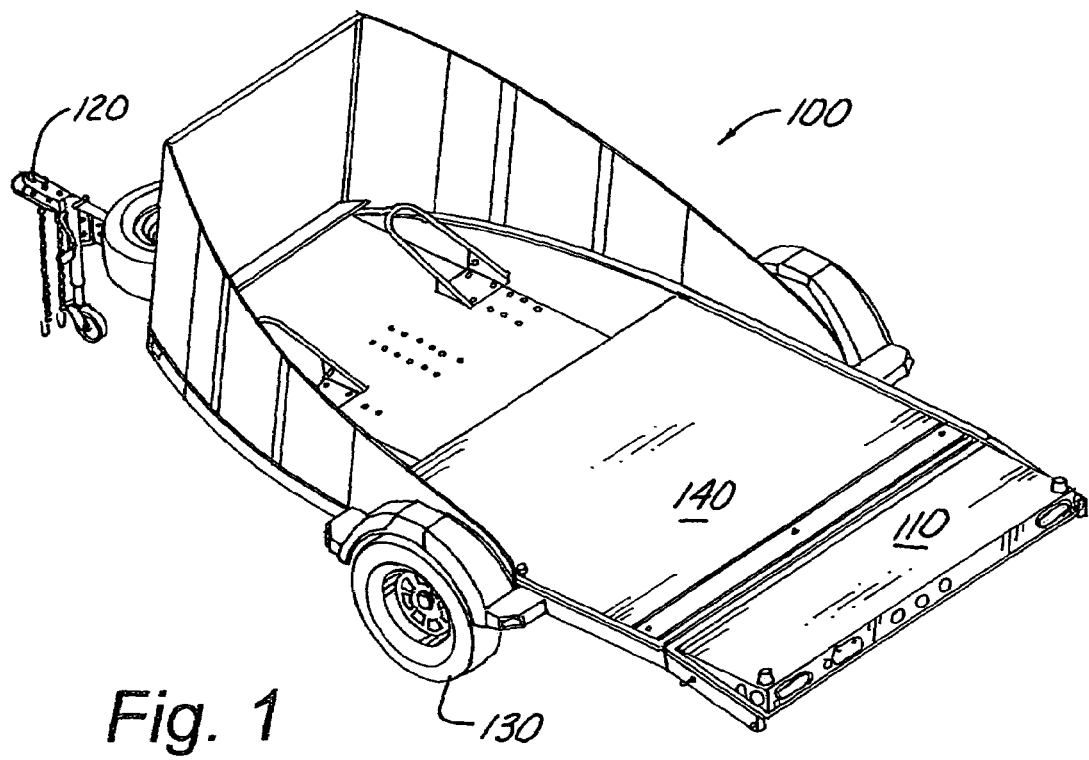
FIG. 1 is a perspective view of a motorcycle transport trailer with a trailer tailgate in a transport position.

An example of a trailer 100 having a trailer tailgate 110 of the present invention is shown in FIG. 1. The trailer 100 is drawn by a tongue 120, the forward direction of the trailer being parallel to and toward the tongue 120. The front of the trailer is toward the tongue. Wheels 130 provide rolling support for the trailer 100, in general. The trailer 100 depicted in FIG. 1, has two wheels 130, only one visible. The trailer tailgate 110 of the present invention is not limited to use on a single axle trailer 100. In particular, the wheels 130 support a deck 140 on which cargo is supported for transport.

Figure 2:
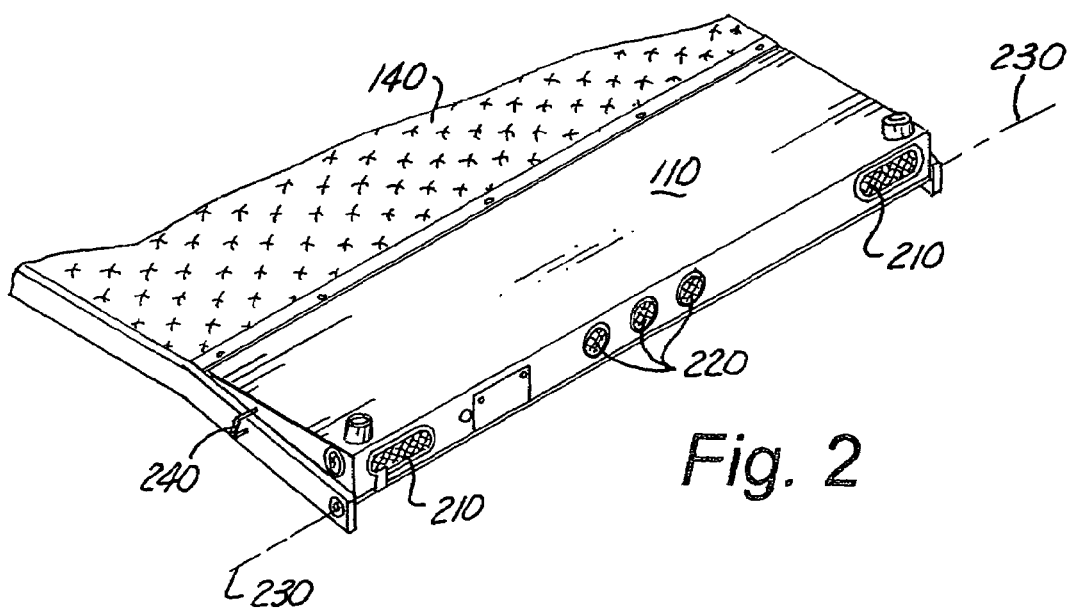
FIG. 2 is a perspective view of the trailer tailgate of the present invention in a transport position.

The trailer tailgate 110 in FIGS. 1 and 2 is shown in its transport position. In this position, the trailer tailgate 110 lies on the deck 140 of the trailer 100. When in the transport position, the combination of the tailgate 110 and the exposed deck 140 preferably make up a substantially planar top surface. The wedge shape of the tailgate 110 makes this possible. Recessed taillights 210 and reflectors 220 are disposed to the rear of the trailer 100.

Figure 4:
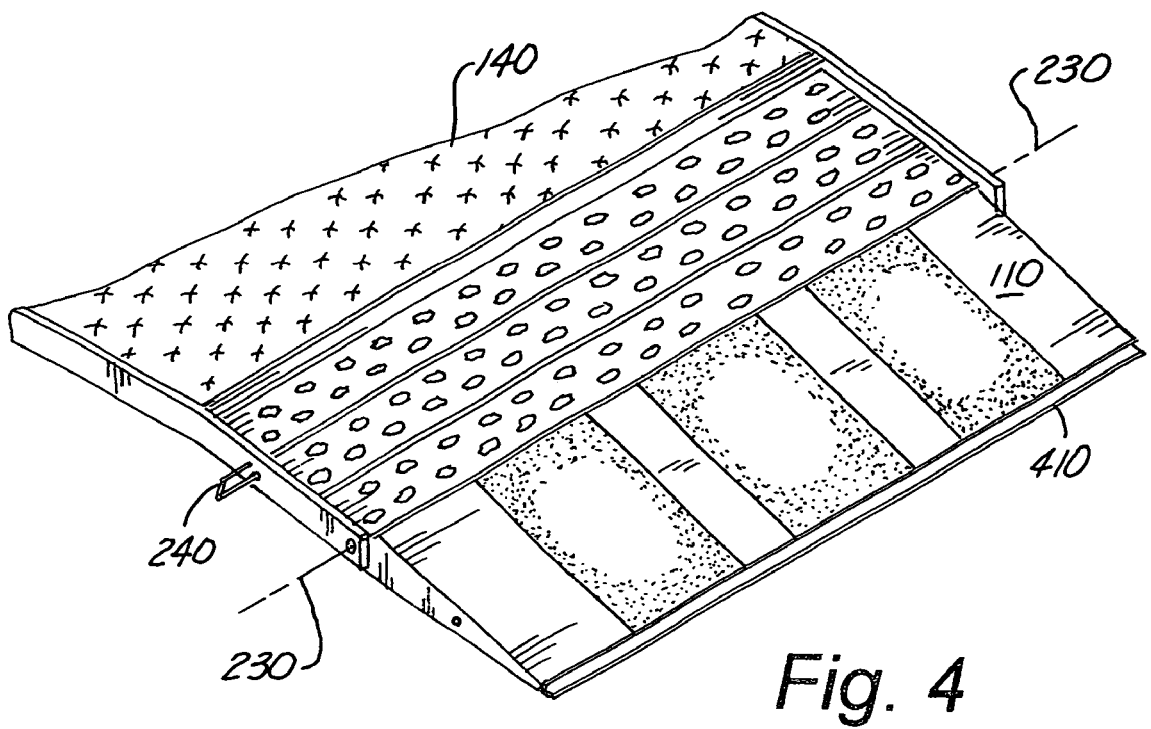
FIG. 4 is a perspective view of the trailer tailgate in its loading-ramp position.

An axis of rotation 230 is shown as a dot-dashed line in FIG. 2. The trailer tailgate 110 pivots on this axis of rotation 230 when converting between the transport position (FIGS. 1, 2, and 5) and the loading-ramp position (FIGS. 4, 6, and 7). Note that the axis of rotation 230 is below the trailer tailgate 110 when the trailer tailgate 110 is in its transport position.

Figure 3:
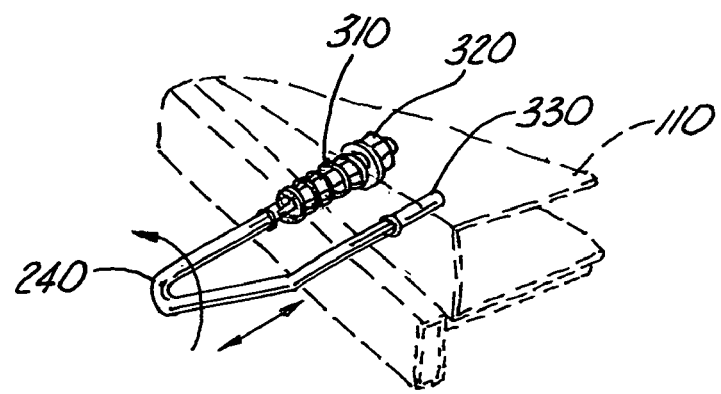
FIG. 3 is a perspective view of a latch-pin assembly for securing the trailer tailgate.

A latch pin 240 is used to secure the trailer tailgate 110 in the transport position. A latch pin assembly of the preferred embodiment is detailed in FIG. 3. A spring 310 provides a force compelling the latch pin 240 toward the trailer 100. A nut 320 disallows the latch pin 240 from being pulled from a hole in which it is engaged on the trailer 100. An end 330 opposite that of the nut 320 in the roughly U-shaped latch pin 240 engages a hole in the trailer tailgate 110.

To convert the trailer tailgate 110 from its transport position (FIGS. 1, 2, and 5) to its loading-ramp position (FIGS. 4, 6, & 7), the latch pin 240 is pulled away from the trailer 100, compressing the spring 310 until the end 330 opposite the nut 320 disengages from the hole in the trailer tailgate 110. At this point, the trailer tailgate 110 may be lifted from the deck 140 and rotated about the axis of rotation 230 until it contacts the ground or pavement behind the trailer 100.

The trailer tailgate 110 is shown in its loading-ramp position in FIG. 4. The top surface of the trailer tailgate 110 (in this position) at the front edge is substantially even with the deck 140 of the trailer 100. The taillights 210 are protected in this position. The axis of rotation 230 is now above the trailer tailgate 110 in the loading-ramp position. The thin, rearmost edge 410 of the trailer tailgate 110 is typically supported by pavement or ground behind the trailer 100.

Figure 5:
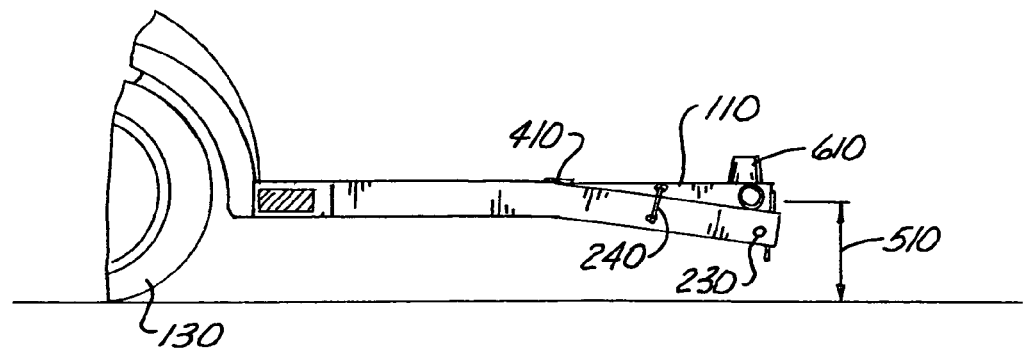
FIG. 5 is a side elevation view of a rear portion of the trailer with the trailer tailgate in its transport position.
Figure 6:
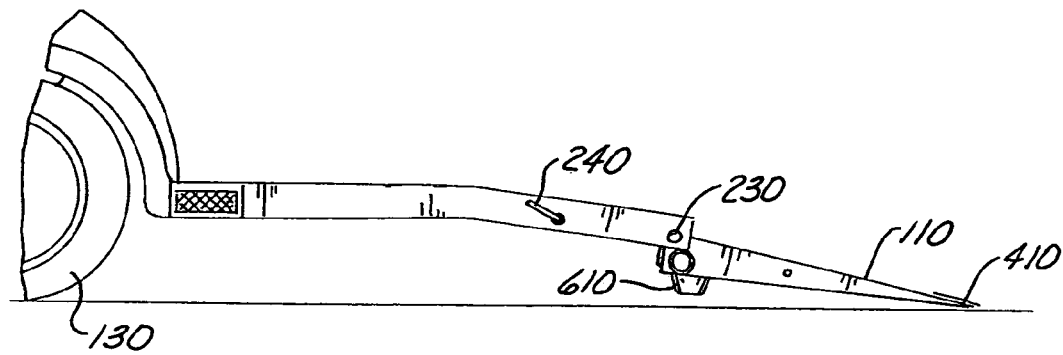
FIG. 6 is a side elevation view of a rear portion of the trailer with the trailer tailgate in its loading ramp position.
Figure 7:
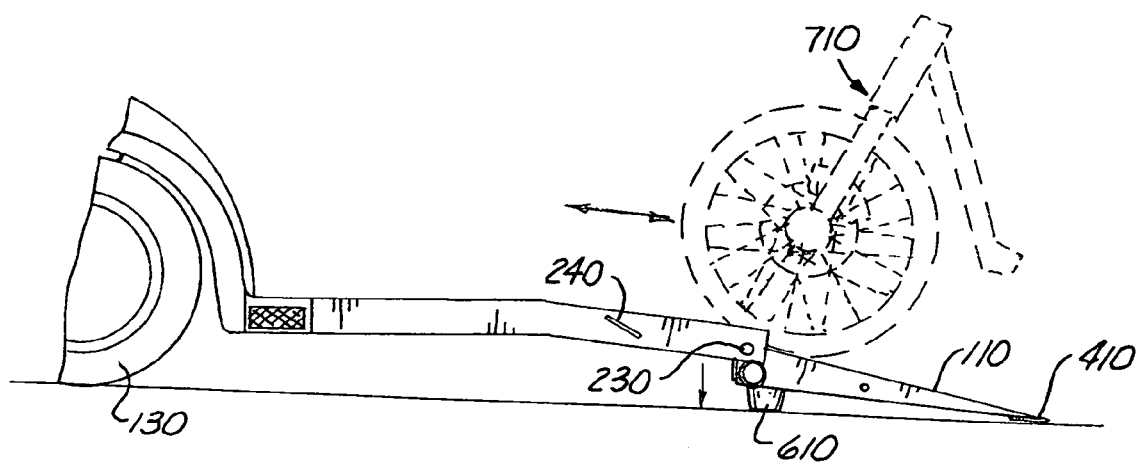
FIG. 7 is a side elevation view of a rear portion of the trailer with the trailer tailgate in its loading ramp position, a motorcycle being loaded thereon.

The trailer 100 is shown from the side in FIGS. 5–7. The trailer tailgate 110 is in the transport position in FIG. 5. A characteristic height 510 is shown for the trailer tailgate 110. After freeing the pin 240 and pivoting the trailer tailgate 110 on its axis of rotation 230, the trailer tailgate 110 is in its loading-ramp position as shown in FIGS. 6 and 7. Note that the end of the tailgate with the taillights 210 is noticeably lower in FIG. 6 than it was in FIG. 5 due to the location of the axis of rotation 230 relative to the trailer tailgate 110. Because of the lowering of the characteristic height, the approach angle is quite shallow, permitting items such as street bikes with a low ground clearance, to be loaded without bottoming out.

A plurality of bumpers 610, made of an elastic material such as rubber, are mounted on the surface of the trailer tailgate 110 closest to the ground when the trailer tailgate 110 is in its loading-ramp position. Because of the wedge-shape of the tailgate, the bumpers 610 are in a low position when in the loading-ramp position.

In FIG. 7, the trailer tailgate 110 is being used to load or unload a motorcycle 710. Note that, under the weight of the motorcycle and/or people, the bumpers 610 are lowered down to come into contact with the ground or pavement as shown by the arrow beneath the trailer deck 140.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

We claim:

1. A trailer apparatus comprising:
    a frame having a front, a rear, a first side and a second side;
    a tongue operatively attached to the frame for operatively attaching the tongue to a prime mover and extending forwardly;
    at least two wheels operatively attached to the frame for allowing the frame to be towed from place to place;
    a first substantially planar surface disposed in a first plane, the substantially planar surface being operatively attached to the frame between the wheels and extending rearwardly of the wheels, the first substantially planar surface having a front, a rear, a first side and a second side;
    a second substantially planar surface operatively attached to the frame, the second substantially planar surface having a front, a rear, a first side and a second side, the second substantially planar surface being positioned in a second plane disposed at an angle with respect to the first plane, said second substantially planar surface being disposed rearwardly of the first substantially planar surface and being in juxtaposition with the rear of the first substantially planar surface, the front of the second substantially planar surface being higher than the rear of the second substantially planar surface;
    a wedge-shaped trailer tailgate operatively pivotally attached at one end thereof to the frame adjacent the rear of the second substantially planar surface, the wedge-shaped trailer tailgate having a thick end, disposed to a front of the trailer when the wedge-shaped trailer tailgate is in a loading position, the wedge-shaped trailer tailgate having a first planar surface on one side thereof and a second planar surface on the other side thereof;
    a hinge operatively attached to the frame and to the wedge-shaped trailer tailgate, an axis of rotation of the hinge being disposed closer to the first planar surface on one side thereof than the second planar surface on the other side thereof of wedge-shaped trailer tailgate;
    when the wedge-shaped trailer tail gate is in the loading position, the other end of the wedge-shaped trailer tailgate is disposed downwardly towards a same surface on which the wheels are resting and the first planar surface of the wedge-shaped trailer tailgate is disposed in a plane substantially the same as the second substantially planar surface of the trailer and a transport position wherein the second planar surface of the wedge-shaped trailer tailgate is substantially aligned with the first substantially planar surface of the trailer when the tailgate is in the transport position for creating a substantially continuous planar surface between the first substantially planar surface of the trailer and the second planar surface of the wedge-shaped trailer tailgate, and wherein the first planar surface of the wedge-shaped trailer tailgate lies in a different plane than the second planar surface of the wedge-shaped trailer tailgate; and
    at least one bumper operatively attached to the second planar surface of the wedge-shaped trailer tailgate at a position closer to the one end thereof with the hinge thereon than to the other end of the a wedge-shaped trailer tailgate, the at least one bumper extending downwardly in the transport position of the wedge-shaped trailer tailgate and being disposed above the other end of the wedge-shaped trailer tailgate when there is no substantial load on the trailer for substantially preventing the second side of the wedge-shaped trailer tailgate from contacting the same surface on which the wheels are resting, thereby substantially preventing any marring of the second side of the wedge-shaped trailer tailgate.

2. The trailer apparatus of claim 1 wherein the at least one bumper extends in a direction generally transverse to the second planar surface near the first end of the wedge-shaped trailer tailgate and wherein there are no bumpers operatively attached to the other end of the second planar surface of the wedge-shaped trailer tailgate, whereby the rear of the trailer can flex downwardly when placing a load on the trailer from the wedge-shaped trailer tailgate in the transport position thereof until the at least one bumper contacts the same surface on which the wheels are resting.

3. The trailer apparatus of claim 1 wherein the first substantially planar surface of the trailer is continuous from one side of the frame to the other side of the frame.

4. The trailer apparatus of claim 3 wherein the second substantially planar surface of the trailer is continuous from one side of the frame to the other side of the frame.

5. The trailer apparatus of claim 4 wherein the first planar surface of the wedge-shaped trailer tailgate is continuous from one side of the wedge-shaped trailer tailgate to the other side of the wedge-shaped trailer tailgate.

6. The trailer apparatus of claim 4 wherein the second planar surface of the wedge-shaped trailer tailgate is continuous from one side of the wedge-shaped trailer tailgate to the other side of the wedge-shaped trailer tailgate.

7. The trailer apparatus of claim 6 wherein the wedge-shaped trailer tailgate extends continuously from one side of the frame to the other side of the frame.

8. The wedge-shaped trailer tailgate of claim 2 wherein the at least one bumper is made of an elastic material.

9. The wedge-shaped trailer tailgate of claim 2 wherein there is a bumper on each side of the one end of the wedge-shaped trailer tailgate.

10. The wedge-shaped trailer tailgate of claim 1 additionally comprising taillights recessed into the thick end disposed to face back when the wedge-shaped tailgate is in the transport position.

11. The wedge-shaped trailer tailgate of claim 10 wherein the taillights are protected under the trailer deck when the wedge-shaped trailer tailgate is in the loading-ramp position, said taillights facing forward.

12. The wedge-shaped trailer tailgate of claim 1 additionally comprising a latch pin assembly comprising:
  (a) a substantially U-shaped latch pin, a first end of the substantially U-shaped latch pin pivotally engaging a hole in the frame and a second end of the substantially U-shaped latch pin made to optionally engage a hole in the wedge-shaped trailer tailgate such that, when the substantially U-shaped latch pin is engaged in the wedge-shaped trailer tailgate, the wedge-shaped trailer tailgate is secured to the frame;
  (b) a nut affixed to the first end of the substantially U-shaped latch pin; and
  (c) a spring into which the first end of the substantially U-shaped latch pin engages, said spring bearing on a surface of the frame and the nut such that the substantially U-shaped latch pin is forced toward the frame by the spring.

13. A trailer apparatus comprising:
  a frame having a front, a rear, a first side and a second side;
  a tongue operatively attached to the frame for operatively attaching the tongue to a prime mover and extending forwardly;
  at least two wheels operatively attached to the frame for allowing the frame to be towed from place to place;
  a first substantially planar surface disposed in a first plane, the substantially planar surface being operatively attached to the frame between the wheels and extending rearwardly of the wheels, the first substantially planar surface having a front, a rear, a first side and a second side;
  a second substantially planar surface operatively attached to the frame, the second substantially planar surface having a front, a rear, a first side and a second side, the second substantially planar surface being positioned in a second plane disposed at an angle with respect to the first plane, said second substantially planar surface being disposed rearwardly of the first substantially planar surface and being in juxtaposition with the rear of the first substantially planar surface, the front of the second substantially planar surface being higher than the rear of the second substantially planar surface;
  a wedge-shaped trailer tailgate operatively pivotally attached at one end thereof to the frame adjacent the rear of the second substantially planar surface, the wedge-shaped trailer tailgate having a thick end, disposed to a front of the trailer when the wedge-shaped trailer tailgate is in a loading position, the wedge-shaped trailer tailgate having a first planar surface on one side thereof and a second planar surface on the other side thereof;
  a hinge operatively attached to the frame and to the wedge-shaped trailer tailgate, an axis of rotation of the hinge being disposed closer to the first planar surface on one side thereof than the second planar surface on the other side thereof of wedge-shaped trailer tailgate;
  when the wedge-shaped trailer tail gate is in the loading position, the other end of the wedge-shaped trailer tailgate is disposed downwardly towards a same surface on which the wheels are resting and the first planar surface of the wedge-shaped trailer tailgate is disposed in a plane substantially the same as the second substantially planar surface of the trailer and a transport position wherein the second planar surface of the wedge-shaped trailer tailgate is substantially aligned with the first substantially planar surface of the trailer when the tailgate is in the transport position for creating a substantially continuous planar surface between the first substantially planar surface of the trailer and the second planar surface of the wedge-shaped trailer tailgate, and wherein the first planar surface of the wedge-shaped trailer tailgate lies in a different plane than the second planar surface of the wedge-shaped trailer tailgate; and
  wherein the wedge-shaped trailer tailgate additionally comprising taillights recessed into the thick end disposed to face rearwardly when the wedge-shaped tailgate is in the transport position.

14. The wedge-shaped trailer tailgate of claim 13 wherein the taillights are facing forwardly and are protected under the trailer deck when the wedge-shaped trailer tailgate is in the loading position.

* * * * *